United States Patent
Sobieski et al.

(10) Patent No.: US 8,227,530 B1
(45) Date of Patent: Jul. 24, 2012

(54) VINYL HALIDE POLYMER FILMS WITH BARIUM SULFATE AND CALCIUM CARBONATE FILLER

(75) Inventors: Robert T. Sobieski, Charlotte, NC (US); Allan Marshall, Hudson, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 208 days.

(21) Appl. No.: 12/685,993

(22) Filed: Jan. 12, 2010

Related U.S. Application Data

(60) Provisional application No. 61/144,012, filed on Jan. 12, 2009.

(51) Int. Cl.
*C08L 99/00* (2006.01)
*C08F 114/06* (2006.01)

(52) U.S. Cl. ........... 524/75; 524/433; 524/436; 526/344

(58) Field of Classification Search ............ 524/75, 524/433, 436; 526/344
See application file for complete search history.

(56) References Cited

U.S. PATENT DOCUMENTS

| | | | | |
|---|---|---|---|---|
| 4,838,945 | A | * | 6/1989 | Fujii et al. .................. 137/7 |
| 6,068,910 | A | | 5/2000 | Flynn et al. |
| 6,887,555 | B2 | * | 5/2005 | Woo et al. .................. 428/138 |
| 7,029,759 | B2 | * | 4/2006 | Sobieski et al. ............ 428/522 |
| 2008/0194736 | A1 | * | 8/2008 | Lu .................. 524/35 |

OTHER PUBLICATIONS

Acquarulo, Larry, "Specialty Compounds for Medical Applications: An Introduction." Medical Plastics and Biomaterials Magazine. (Sep. 1996).

* cited by examiner

*Primary Examiner* — Robert D. Harlan
(74) *Attorney, Agent, or Firm* — Kagan Binder, PLLC; David Burleson

(57) ABSTRACT

A vinyl halide polymer film is provided comprising barium sulfate filler and calcium carbonate filler. The film has a total filler content of at least about 60 phr, and the ratio of barium sulfate filler to calcium carbonate filler is from about 1:3 to about 3:1 by weight. These films exhibit exceptional strength, durability, emission and aesthetic performance properties. Significant manufacturing advantages are also observed.

11 Claims, 2 Drawing Sheets

VINYL HALIDE POLYMER FILMS WITH BARIUM SULFATE AND CALCIUM CARBONATE FILLER

CROSS-REFERENCE TO RELATED APPLICATIONS

This application claims the benefit of U.S. Provisional Application Ser. No. 61/144,012, filed Jan. 12, 2009, entitled "VINYL HALIDE POLYMER FILMS WITH BARIUM SULFATE AND CALCIUM CARBONATE FILLER" which application is incorporated herein by reference in its entirety.

FIELD OF THE INVENTION

This invention relates to halogen-containing vinyl polymer compositions, such as vinyl chloride polymer films, having fillers. In particular, this invention relates to vinyl halide polymer films having a filler that comprises barium sulfate and calcium carbonate in specified amounts and ratios.

BACKGROUND OF THE INVENTION

Vinyl halide films or sheets can be used in a wide range of applications including pool liners, graphic arts, transaction cards, security cards, veneers, wall coverings, book bindings, folders, floor tiles and products which may be printed or decorated or laminated in a secondary operation. Typically, such films comprise a filler component that is selected for its compatibility with the resin component, and additionally for its low cost. An important filler for use in many applications, and in particular wallcovering applications, is calcium carbonate for the reasons above. Typical compounds that are used to prepare films or sheets are limited in the amount of filler that can be incorporated, because the sheet tends to lose its integrity and to form pinholes (or much larger holes) if too much filler is incorporated. Other stability issues also arise if too much filler is incorporated. A vinyl based wallcovering sheet typically comprises less than about 44 phr $CaCO_3$.

Various vinyl halide films are known in the art. A film that includes chloride-containing vinyl polymer and a stabilizer component, wherein the film has a 96-hour Volatile Organic Compound Emission Factor of no more than 1,000 $\mu g/m^2/$hour is described in U.S. Pat. No. 7,029,759. This patent also describes a film that includes vinyl chloride polymer and a stabilizer component comprising a stabilizer and a diluent, wherein the diluent comprises a monohydric alcohol having 12 or more carbon atoms.

U.S. Pat. No. 6,068,910 to Flynn, et al discloses a polyester resin composition for calendering, comprising a polyester having a crystallization half time from a molten state of at least 5 minutes and an additive for preventing sticking of the polyester to calendering rolls. This patent also discloses a process for preparing a film or a sheet that comprises the step of calendering such polyester resin composition.

Barium sulfate has been described for use as a filler in various plastics. For example, it is used as a radiopaque filler in medical plastics, as discussed in the article "Specialty Compounds for Medical Applications: An Introduction" by Larry Acquarulo for the *Medical Plastics and Biomaterials* Magazine.
http://www.devicelink.com/mpb/archive/96/09/003.html.
This article describes the ability to use up to about 60% barium sulfate filler for rigid articles.

SUMMARY OF THE INVENTION

A vinyl halide polymer film is provided that comprises barium sulfate filler and calcium carbonate filler. The film has a total filler content of at least about 60 phr, and the ratio of barium sulfate filler to calcium carbonate filler is from about 1:3 to about 3:1 by weight. Preferably, the film is sufficiently flexible to be bendable to an angle of 45 degrees at a force less than about 300 g*cm as measured by the Cantilever Bending Test (ASTM D5732). In another embodiment, the film is sufficiently flexible to be bendable to an angle of 45 degrees at a force less than about 240 g*cm. In another embodiment, the film is sufficiently flexible to be bendable to an angle of 45 degrees at a force less than about 150 g*cm.

Films of the present invention provide high density materials that are useful in many applications where flexible films having excellent strength are desired. Because of the selection of the filler as described herein, the films exhibit relatively high density and opacity properties as compared to conventional films having the same amount by weight of only calcium carbonate fillers. In an embodiment of the present invention, the present films can be prepared having the same opacity as conventional films having the same amount by weight of only calcium carbonate fillers, but using less or no $TiO_2$ opacifier. The films therefore satisfy performance properties in durability and aesthetic performance for applications such as wall coverings and in furniture manufacture, that would otherwise require the use of much thicker films. Because a film of less thickness can satisfy such performance requirements, the film can be more flexible and exhibit greater elongation than a conventional film having the same amount by weight of only calcium carbonate fillers that otherwise meets weight and opacity requirements of any particular application.

Additionally, the present films exhibit modulus, tear and tension strength properties that are higher than conventional films having the same amount by weight of only calcium carbonate fillers.

Surprisingly, films having the combination of barium sulfate filler and calcium carbonate filler as described herein exhibit superior properties during manufacture, because the resin/filler combination exhibits excellent thermal stability, and therefore is easier to process. Thus, the materials used to make the present films exhibit superior processability and thermal stability. In an aspect of the present invention, the described formulation permits manufacture of films at increased production rates. Thus, more mass of material can be run through the production equipment without damaging film and without fear of overheating. This leads to safer process conditions through better heat stability, and/or better calendaring quality.

The present combination of fillers further permits formation of films with less stabilizer, such as organophosphite, zinc octoate, zinc and calcium stearate, and the like.

The final film properties of the present film are also superior, because the films exhibit superior coating and ink adhesion, both in the short and long term, as compared to conventional films having the same amount by weight of only calcium carbonate fillers. In an embodiment of the present invention, the present films exhibit at least a 5% reduction, and preferably at least a 10% reduction in contact angle with water and n-hexadecane as compared to conventional films having the same amount by weight of only calcium carbonate fillers. Additionally, the present film exhibits superior texture properties and grain retention, and additionally superior color control.

The present films also exhibit superior long term physical stability, i.e. light, heat and humidity stability, as compared to conventional films having the same amount by weight of only calcium carbonate fillers. For example, the present films exhibit superior cold crack properties, and thus perform well at very low temperatures.

In an aspect of the present invention, the present films exhibit lower fugitive emissions as compared to conventional films having the same amount by weight of only calcium carbonate fillers.

DETAILED DESCRIPTION

Figure 1:
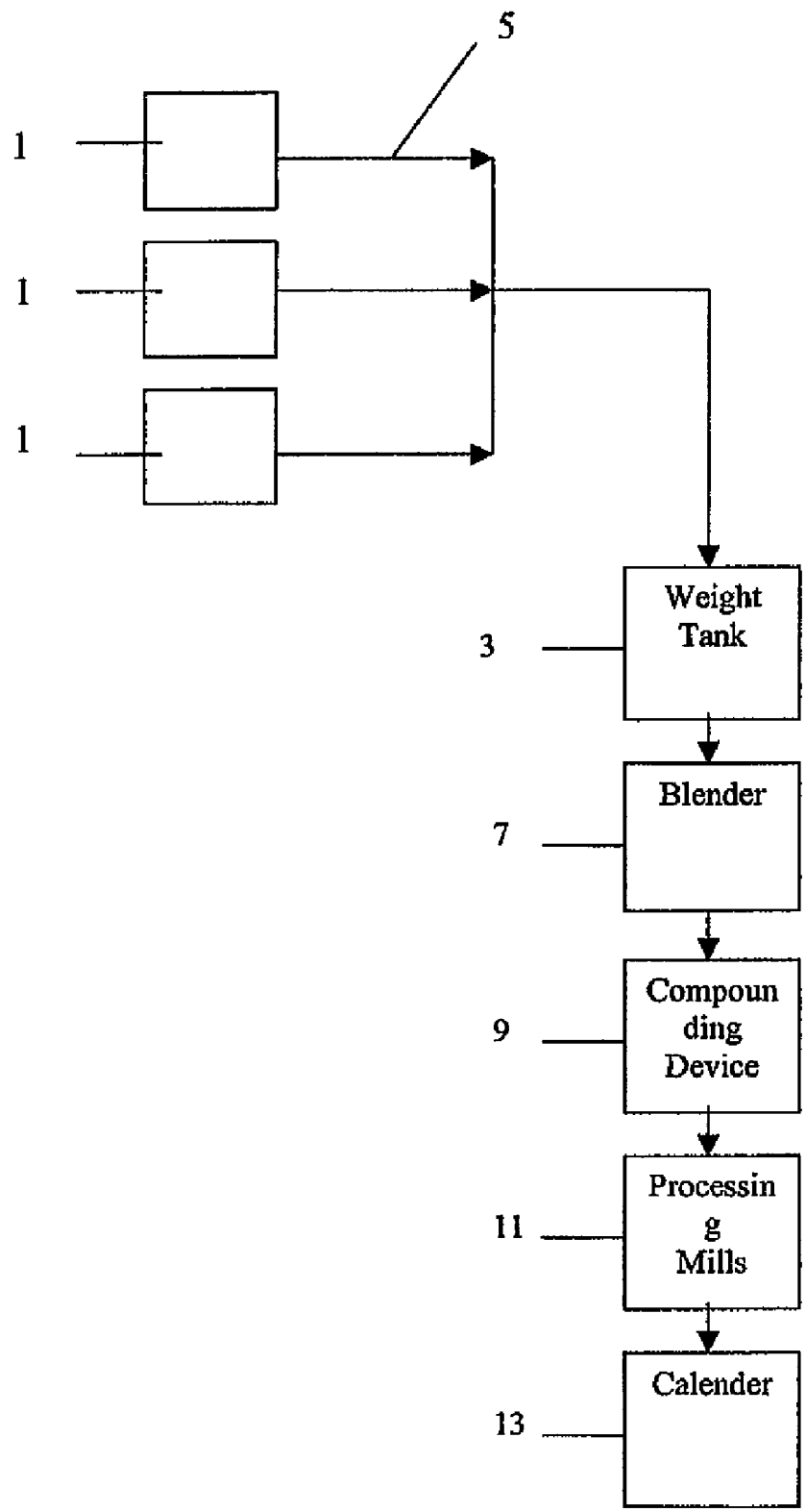
FIG. 1 shows a flow diagram of the processing of the vinyl halide polymer composition according to one embodiment of the invention.

As noted above, the composition comprises a unique filler system comprising barium sulfate filler and calcium carbonate filler, wherein the film has a total filler content of at least about 60 phr. The ratio of barium sulfate filler to calcium carbonate filler is from about 1:3 to about 3:1 by weight. In an embodiment of the present invention, the film has a total filler content of at least about 80 phr. In another embodiment, the film has a total filler content of at least about 100 phr.

In an embodiment of the present invention, the ratio of barium sulfate filler to calcium carbonate filler is from about 1:2 to about 2:1 by weight.

In an embodiment of the present invention, the barium sulfate filler has an average particle size of from about 1 to about 10 microns. In an embodiment of the present invention, the calcium carbonate filler has an average particle size of from about 1 to about 10 microns.

Optionally, the vinyl chloride polymer composition can include one or more additional fillers. When included, such fillers can provide such advantages as reduced production costs, opacity of the vinyl chloride polymer, resistance to blocking, reduced plate-out, improved dry blending. Fillers are known in the art, and any suitable filler can be included according to the invention. Examples of fillers include silica and talc.

The vinyl halide polymer composition can be a suspension grade vinyl halide polymer over any molecular weight distribution. According to the invention, the vinyl halide polymer is an aqueous based polymer. Reference will be made to chloride-containing vinyl polymers as an exemplary embodiment of the invention; however, it is understood that other halogens may be used in the vinyl halide polymer composition according to the invention.

In one embodiment, the vinyl chloride polymer can be a homopolyvinyl chloride or a copolymer of a major amount by weight of vinyl chloride (for example, 80% by weight or more of vinyl chloride) and a minor amount by weight (for example, 20% by weight or less) of a copolymerizable monomer selected from the group vinyl acetate, vinylidene chloride and maleic ester. Bulk and solution vinyl chloride polymers can also be used. Resin material can be solvated in adequate solution form, for example, as a plastisol. Mixtures or reaction products of vinyl chloride polymers and/or other resins can be used. Vinyl chloride polymers and copolymers are well known.

The stabilizer component can be selected to provide one or more benefits to the vinyl chloride polymer composition, including reduction of discoloration, lubrication during processing, reduction of plate-out effects, compatibility with the resin systems, and resistance to sulfur staining as a result of atmospheric discoloration. The stabilizer component of the vinyl chloride polymer composition preferably includes one or more secondary stabilizers. Typically, secondary stabilizers are chosen to scavenge the hydrogen chloride generated by degradation of the vinyl chloride polymer composition. These stabilizers promote long-term stability of the vinyl chloride polymer composition.

Examples of suitable secondary stabilizers include alkyltin stabilizers, mixed metal stabilizers, alkyl phosphite stabilizers, β-diketones stabilizers, epoxidized fatty acid ester stabilizers, hydrotalcites stabilizers, and combinations of two or more of these. Further examples of secondary stabilizers include materials such as bis-phenylol propane, butylated hydroxytoluene, pentaerythritol, calcium, barium, and epoxy materials, and the like.

Examples of suitable alkyltin stabilizers include mono- and dimethyl-, butyl-, and octylin thioglycolates, mercaptopropionates, and alkyl maleates. Examples of suitable mixed metal stabilizers include metal carboxylates, such as basic carboxylates derived from metals such as potassium, calcium or barium, which have little or no Lewis acidity and function primarily as hydrogen chloride scavengers.

Examples of suitable alkyl phosphite stabilizers include trialkyl phosphites. An example of a suitable epoxidized fatty acid esters includes epoxidized soybean oil. Examples of suitable hydrotalcite stabilizers include natural minerals, such as $Mg_6Al_2(OH)_{16}CO_{3-4}H_2O$.

Preferably, the stabilizer comprises an organophosphite stabilizer. One preferred organophosphite stabilizer comprises penta bis(2,4-dicumylphenyl pentaerythritol diphosphite), commercially available from Dover Chemical Corporation (Dover, Ohio) under the mark DOVER PhosBoosters™.

The stabilizer component is present in the vinyl chloride polymer composition in an amount effective to provide suitable stability to the polymer composition, by reducing degradation of the polymer composition, for example, a vinyl chloride polymer film.

Other ingredients can be included to enhance the performance of the stabilizer component in the vinyl chloride polymer composition. Examples of such additional ingredients include compounds to enhance solubility of the stabilizer component or other additives. Solubilizing agents include stearates, laurates, pentaerythritol and the like.

The vinyl chloride polymer composition can include one or more primary stabilizers. Generally, primary stabilizers are selected to react with allylic chlorides, so that the stabilizer is associated by complex formation with polymer chloride atoms. Thus, a primary stabilizer is a Lewis acid and provides short-term color stability to the vinyl chloride polymer composition. Examples of primary stabilizers include metals, which form metal chlorides, including zinc, cadmium, tin and lead. These metals are stronger Lewis acids and form covalent carboxylates, not only scavenge hydrogen chloride, but also substitute carboxylate for the allylic chlorine atoms.

The vinyl chloride polymer composition can also include plasticizer in amounts effective to make the polymer suitably flexible. Typical effects of plasticizers on vinyl chloride polymer film include increased flexibility, softness and elongation. Plasticizers can increase low temperature flexibility, improve roll release on calendars, reduce plate-out, and promote fusion. They can also reduce processing temperatures and melt viscosity in the case of calendering. The amount of plasticizer can be 30 to 100, or 30 to 50, or 34 to 45 parts-per-hundred parts resin.

Examples of suitable plasticizers include butyl octyl phthalate, dioctyl phthalate, hexyl decyl phthalate, dihexyl phthalate, diisooctyl phthalate, dicapryl phthalate, di-n-hexyl azelate, diisononyl phthalate, dioctyl adipate, dioxtyl sebacate, trioctyl trimellitate, triisooctyl trimellitate, triisononyl trimellitate, isodecyl diphenyl phosphate, tricresyl phosphate, cresyl diphenyl phosphate, polymeric-plasticizers, epoxidized soybean oil, octyl epoxy tallate, isooctyl epoxy tallate, and the like. Plasticizers are well known in the wallcovering industry. Mixtures of plasticizers can also be used in accordance with the invention.

Other vinyl chloride polymer compounding ingredients can be incorporated into the vinyl chloride polymer compositions of the invention. Examples of such ingredients include silicas such as precipitated silica, fumed colloidal silica, calcium silicate, and the like, calcium carbonate, ultraviolet light absorbers, antifungal agents, antimicrobial agents, carbon black, barites, dibasic lead phosphite, antimony ($Sb_2O_3$), zinc borate, blowing agents, antioxidants, densifying agents, and the like, as well as mixtures thereof. Coloring agents or opacifiers can be included, for example, $TiO_2$, red iron oxide, phthalocyanine blue, or green or other color pigments. Pigments and other dry additives are preferably dispersed or dissolved in one or more plasticizers before adding to the plasticized vinyl chloride polymer compositions. These compounding ingredients are used in effective amounts by weight to control such attributes of the vinyl chloride polymer as color, mildew, stabilization, and viscosity.

Optionally, the vinyl chloride polymer composition can include lubricants, which can provide such benefits as improved internal flow characteristics of the polymer compound, reduced tendency for the compound to stick to the process machinery, improved surface smoothness of the finished product, and improved heat stability by lowering internal and/or external friction. Examples of lubricants include stearic acid, calcium stearate, zinc stearate, fatty acid esters and amides, distearyl phthalate, stearyl alcohol, Wax E, polyethylene AC 617, and the like.

The vinyl chloride polymer of the invention can optionally further include one or more blending or extender resins. Such blending or extender resins are included in a minor amount by weight as compared to the vinyl chloride polymer composition.

In some embodiments, the vinyl chloride polymer can contain one or more flame retardants, such as, for example, aluminum trihydrate, aluminum hydroxide, zinc stannate, antimony oxide, and the like.

FIG. 1 shows a flow diagram of the processing of the vinyl chloride polymer composition of the invention. This process will now be described in more detail.

Referring to FIG. 1, individual ingredients are introduced through inlets 1 into weight tank 3 via pipeline 5. The major raw materials are weighed in weight tank 3, and are then added to blender 7. Smaller amounts of materials, typically pigments and stabilizers, can be masterbatched (e.g., combined with some of the larger additives for greater accuracy) ahead of time so that they too can be weighed and added at this initial stage. The blender 7 mixes the dry and wet ingredients prior to mechanical and thermal processing of the material. Once the wet and dry ingredients have been sufficiently blended, they are passed to a compounding device 9.

The ingredients forming the chloride containing vinyl polymer can be charged to and mixed together in any one of several compounding devices, such as a Ross Planetary mixer, Hobart dough type mixer, Banbury, 2-roll rubber mill, Nauta mixer, ribbon blender, and so forth. In one embodiment, the compounding device 9 is a Banbury mixer, an internal mixer produced by Farrel Corporation, (headquarters located in Ansonia, Conn.). The Banbury mixer is used for mixing or compounding plastics and interspersing reinforcing fillers in a resin system. The mixer includes two contra-rotating spiral-shaped blades encased in segments of cylindrical housings, intersecting so as to leave a ridge between the blades. The blades can be cored for circulation of heating or cooling media. The Banbury thus produces a homogeneous mixture of the ingredients. Fed to batch or continuous machines, the blends are formed into homogeneous melt streams under high pressure to produce shear and temperatures around 150° C.

The melt streams are fed to an extruder to form strands, chunks, ribbons, or other acceptable forms. A mill or an extruder, in series with the Banbury mixer, partially degasses the melt and serves as a reservoir to help prevent running calender rolls together. At this stage of the process, the melt is maintained and delivered to the calender at approximately 140° C. to 160° C.

Once blended, the blend is then fed to processing mills 11. The mills 11 are utilized to further shear and mix the compound to bring it to a more uniform, homogeneous result. From the mill, the compound is transferred to a calender 13.

Figure 2:
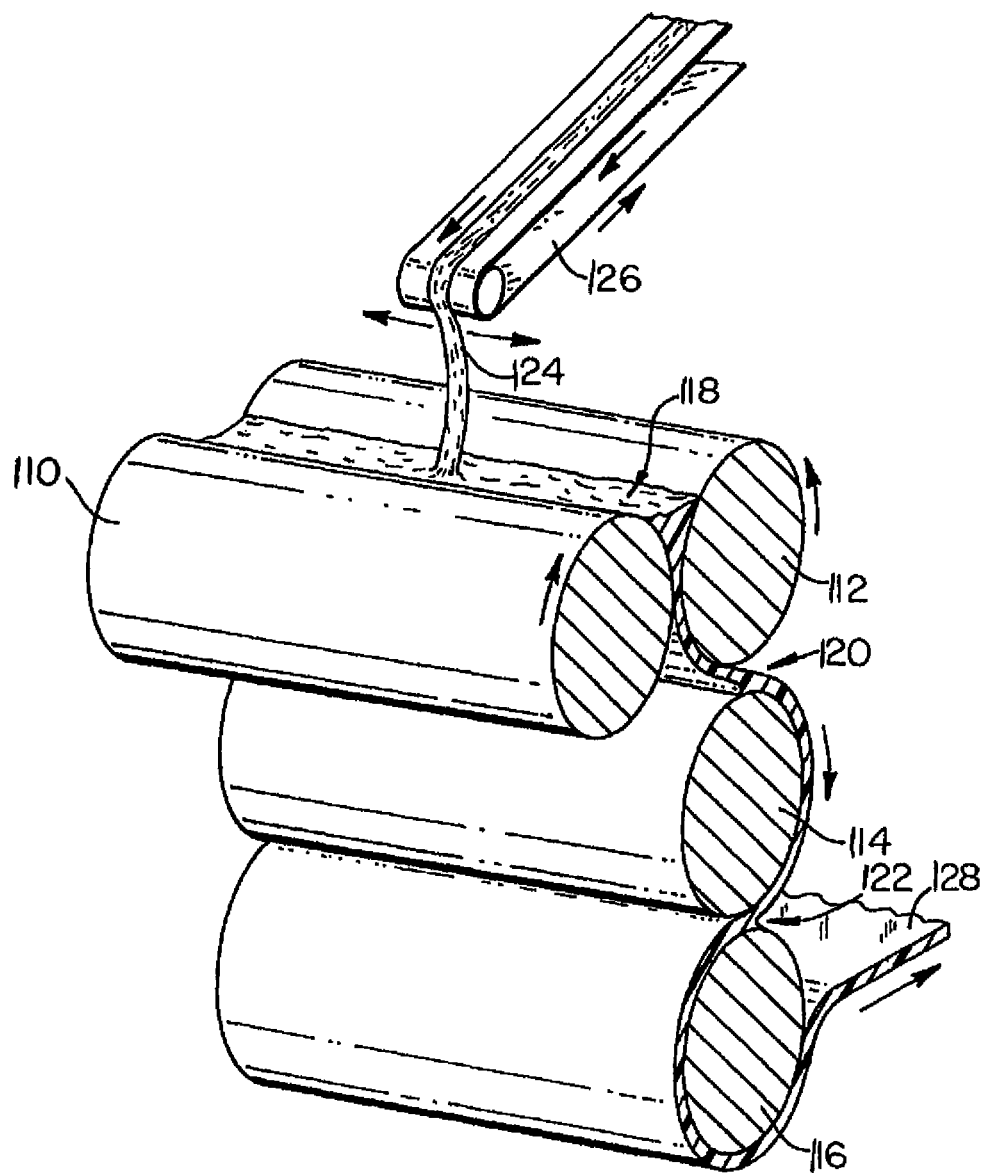
FIG. 2 shows a schematic of the polyester calendering process according to one embodiment of the invention.

FIG. 2 illustrates a preferred calender roll configuration, wherein an inverted "L" configuration is used for the four heated rolls 110, 112, 114, and 116. The four rolls form three compressive nips or gaps. A feed nip 118 is formed between the first roll 110 and second roll 112. A metering nip 120 is formed between the second roll 112 and the third roll 114. A finishing nip 122 is formed between the third roll 114 and the fourth roll 116. A hot strip or rod 124 of the molten polyester resin composition is uniformly fed by a pivot mounted feeding device 126 into the feed nip 118. The molten composition is preferably a homogeneous material as it exits the high energy mixing operation (not shown). The molten composition may be further mixed and heated by the circulating melt bank formed at the feed nip 118. The molten composition is eventually forced between the first roll 110 and the second roll 112 by the rotating action of the rolls, then forced through the metering nip 122 for reduction to its final desired thickness, and finally forced through the finishing nip 122 to form a film or sheet 128 of a particular gauge.

The resulting film or sheet 128 made from the polyester resin composition of the present invention has a uniform thickness that is produced by passing the polyester resin composition through the compressive nips between the heated rolls. In effect, the polyester resin composition is squeezed between the nips, thereby separating the rolls. Each successive nip between the calendering rolls reduces in opening size to obtain the final film or sheet gauge.

The sheet is taken off the last calender roll by a series of small stripper rolls, and then over and under a series of cooling rolls, before finally being wound on a tube or cut into sheets for shipment.

In calendering, PVC tends to follow the hotter and faster roll. Thus, the progression is to have each roll hotter and faster than the previous roll in the stack. Heated either by steam or hot oil, roll temperatures range from 150° C. to 200° C.

Material delivered to the first calender nip is regulated to form a 6-inch diameter rolling bank. The sheet passing the first nip forms another bank about 2 inches in diameter between the second and third rolls and so on until, at the firm nip, the desired thickness is obtained from the smallest bank possible to minimize the stress in the sheet.

Typically, thickness of the sheet coming from the last nip of the calender is intentionally oversized. This is to make up for as much as a ⅔ gage reduction that occurs when the sheet is stretched from 30 to 150% as it is stripped from the last calender roll by a series of two or more small stripping rolls. Design and operation of these stripping rolls affects shrinkage and flatness of the sheet.

Optionally, the chloride containing vinyl polymer film can be embossed, corona-treated, oriented, laminated, or otherwise primed. Embossing of thermoplastic films, layers or sheets is well known and is typically carried out by passing the film between an embossing roll and a backup roll under controlled preheating and post cooling conditions. In one embodiment, the surface of the chloride containing vinyl polymer film is embossed by passing the sheet coming from the stripper rolls between a textured steel roll nipped by a rubber roll that forces the chloride containing vinyl polymer film into the grain.

To laminate another sheet or fabric to the calendered sheet, the sheet can be nipped against the fabric on the last calender roll or a laminating station can be installed in place of or in addition to the embossing rolls.

The sheet is finally passed alternately over and under a series of cooling rolls to bring it to room temperature. The sheet is then trimmed to width and wound on a tube or cut to length and stacked as sheets. The wound or stacked sheets can then be stored for further processing, if desired.

The vinyl chloride polymer composition can be formed into layers or films that can be unsupported or supported. Where a vinyl chloride polymer plastisol composition is used, it can be cast on a release surface and heated to fuse it to form a film. Where a plasticized suspension grade vinyl chloride polymer composition is used, it can be calendered or extruded and fused to form a film. Temperatures can vary from about 200° to 400° F. In preferred embodiments, the compounded vinyl chloride polymer composition is supported or has a backing.

In embodiments where the vinyl chloride polymer composition is supported, the substrate can be a woven fabric (cotton, polyester, cotton blends, nylon, rayon, polyester fiberglass blends, polypropylene, polyethylene, and various blends thereof), a knit fabric, a non-woven fabric, paper, and the like. The fabric can be made of cotton, cellulose, nylon, polyester, aramid, rayon or acrylic fibers or cords or mixtures of the same. In some embodiments, the fabric can be treated with an adhesive coating to adhere or to improve adherence of the fabric with the vinyl chloride polymer composition. The temperature at which the vinyl chloride polymer is laminated is generally around 300° F.

Once the PVC film has been processed, it can be rolled onto itself into bolts of 20 yards, 40 yards, or any suitable amount of product. The bolts can then be packaged in any suitable packaging, such as, for example, plastic or paper wrapping material, for shipment to the consumer.

The surface of the chloride containing vinyl polymer film can be printed one or more times with a suitable receptive ink. Such inks are well known and can be applied by various methods of printing, such as gravure, flexography, screen printing, jet printing, web printing, and the like.

The printing operation can be repeated for the desired number of applications to vary the colors or designs of the polymer composition at temperatures of about 150° F. to 165° F. for each printing step. In typical applications, the vinyl chloride polymer is printed 4-6 times by rotogravure printing. After printing, the polymer composition is dried at about 170° F. in a drying station.

Oftentimes, vinyl halide polymer compositions can be printed to provide a design on the surface of the polymer compositions. Examples of printed vinyl halide polymer compositions include wallcovering and decorative laminates that display a surface design. It has been surprisingly found that the vinyl halide polymer compositions of the invention exhibit improved print quality, including improved print clarity and definition, through increased wettability of the printing vehicle.

Wetting or non-wetting of a solid by a liquid can be understood by studying contact angle. Contact angle methods have been developed extensively over the past several decades, and a large body of data has been accumulated correlating contact angle data with surface properties of tension. Contact angle describes the shape of a liquid drop resting on a solid surface. By drawing a tangent line from the drop shape to the touch of the solid surface, contact angle is defined as the angle between the tangent line and the solid surface. The measurement provides information to study the bonding energy of the solid surface and surface tension of the liquid droplet. Because of the simplicity in technique and measurement, it has been broadly accepted in various research environments and industries for material surface analysis related to wetting, adhesion and absorption. Thus, contact angle surface analysis can be done to determine qualities of the vinyl halide polymer surface, as well as quality of ink and coating wetting and spreading.

When a drop of liquid is resting on a solid surface, the drop of liquid forming an angle can be considered as resting in equilibrium by balancing the three forces involved, namely, the interfacial tensions between the solid and liquid (SL), that between solid and vapor (SV), and that between liquid and vapor (LV). The angle within the liquid phase is known as the contact angle or wetting angle. It is the angle included between the tangent plane to the surface of the liquid and the tangent plane to the surface of the solid, at any point along their line of contact. The surface tension of the solid will favor spreading of the liquid, but this is opposed by the solid-liquid interfacial tension and the vector of the surface tension of the liquid in the plane of the solid surface.

Thus, the critical surface tension of a solid surface is an important consideration when printing on the surface, and the critical surface tension values are intimately related to the surface constitution of the solid. Even small changes in the outermost atomic layer of the solid surface are reflected in a change of critical surface tension, while other properties of the solid might remain essentially unchanged. For example, a simple hydrocarbon surface, like that of polyethylene, exhibits contact angles leading to a critical surface tension of about 31 dynes/cm. Gradual replacement of hydrogen atoms in the surface by fluorine atoms gradually decreases the critical values to 19 dynes/cm as observed with polytetrafluoroethylene. Conversely, gradual replacement of surface hydrogen with chlorine atoms leads to an increased critical surface tension gradually approaching 41 dynes/cm as with polyvinyl chlorides.

Another factor considered when analyzing print quality is the surface tension of the solution to be applied to the solid substrate. For example, the surface tension of water at 20° C. is 72.8 dynes/cm. Thus, it would take a force of 72 dynes to break a surface film of water 1 cm long. The surface tension of water decreases significantly with temperature. Surface tension of water arises from the polar nature of the water molecule. Molecules in liquid state experience strong intermolecular attractive forces. When those forces are between like molecules, they are referred to as cohesive forces. When the attractive forces are between unlike molecules, they are said to be adhesive forces. The adhesive forces between water molecules and the surface of a polymer film, for example, lead to formation of a droplet of the water on the surface of the polymer. When, however, the difference between the surface tension of the droplet and the polymer substrate is sufficiently low, the droplet will wet into the surface of the substrate. Thus, the difference between the surface tension of an ink solution and the surface tension of the polymer composition can affect print quality of the polymer composition.

An alternative, and preferred, method of determining surface tension of vinyl halide polymers is to measure the contact angle when a solution having a known surface tension is applied to the polymer surface. This analysis can provide a more accurate measurement of surface tension of the polymer composition.

According to this embodiment, water (or other suitable liquid) is applied to the surface of the film, and a Contact Angle System is used to measure Contact Angle of the droplet on the surface. Methods for measuring dynamic contact angles can use ASTM D5725-95 as a guide. According to these methods, the droplet of known liquid is applied with a timing accuracy of one millisecond. The droplet makes contact with the substrate at $t_0$ to which all subsequent timestamps are related. A liquid droplet of approximately 1-15 µl is pumped out at a dispensing tip. The droplet is lowered towards the substrate surface in synchronization with the video capture. The interaction between the liquid droplet and the specimen surface can be measured to provide wetting (contact angle), sorption (volume) and spreading (droplet base) measurements as a function of time. In some embodiments, the contact angle measuring system can be located within an environmental chamber, to maintain environmental conditions during analysis.

For example, an FTÅ200 Dynamic Contact Angle System (First Ten Ångstroms, Portsmouth, Va.) can be used to measure contact angle. The FTÅ200 includes a rapid video capture to analyze a drop of water or other liquid on a surface of a material. The drop is dispensed in the range of 1-15 µl, preferably 10 µl. FTA instruments measure the contact angle by imaging the drop on a CCD camera and analyzing the captured images on a personal computer. Because the test substrate is a vinyl polymer, the contact angle does not change over time.

According to this embodiment, a test sample of the vinyl halide polymer composition is introduced into the Contact Angle System. The test sample is a vinyl halide polymer film laminated onto a backing, with no printing or topcoat finishes to obscure the surface of the polymer film. A drop of liquid having a known surface tension (for example, water) is applied to the polymer surface, and dynamic contact angle measurements are made.

Volatile Ingredient Evaluations are made by loading product to be tested into a controlled environmental chamber. The test sample is collected, placed in the environmental chamber, and air samples are collected over time to analyze VOC emissions in accordance with ASTM Standard D5116-97, "Standard Guide for Small Scale Chamber Determination of Organic Emissions from Indoor Materials/Products,"

The present films are useful for applications in which vinyl films are known, and exhibit exceptional performance in these uses. Exemplary uses include as wallcovering, residential upholstery, bus seating, commercial upholstery, pool liners, flooring and the like.

The thickness of the film is primarily determined by the intended use. In an embodiment of the present invention, the film has a thickness of from about 6 to about 24 mils. This thickness is particularly desirable for upholstery applications and the like. In an embodiment of the present invention, the film has a thickness of from about 10 to about 50 mils. This thickness is particularly desirable for flooring applications and the like. In an embodiment of the present invention, the film is a wallcovering. It will be understood that the wallcovering of the invention is an aesthetic and protective sheet material that is preferably applied to a wall, but alternatively may be applied to any other substrate such as a floor, ceiling, container surface or other such substrate to provide an aesthetically pleasing, decorative covering, or a protective covering. In an embodiment, the film is provided in a thickness of from about 4 to about 40 mils. Preferably, the film is from about 4 to about 15 mils thick. Preferably, the wallcovering in one embodiment has a total weight of from about 5-10 oz/yd$^2$, i.e. thereby qualifying as a Type I commercial wallcovering. In another embodiment, the wallcovering has a total weight of from about 11-15 oz/yd$^2$, i.e. thereby qualifying as a Type II commercial wallcovering.

In a preferred embodiment of the present invention, the wallcovering is provided in sheet dimensions appropriate for use as wallcovering materials. In one embodiment, the wallcovering is provided in roll form suitable for residential application and having a lengthwise dimension of at least about 24 feet (or alternatively at least about 30 feet), and a width dimension of at least about 20 inches (or alternatively at least about 27 inches or 36 inches). In another embodiment, the wallcovering is provided in roll form suitable for commercial application and having a width of about 48 inches or 54 inches, and a length of at least about 30 feet.

Preferably, the wallcovering of the present invention has an Elmendorf tear strength of at least about 10 lbs×10 lbs, and more preferably at least about 15 lbs×15 lbs, as determined by CCC-T-191b 5132 test method, and has a Tensile breaking strength of at least about 20 lbs×20 lbs, and more preferably at least about 25 lbs×25 lbs, as determined by CCC-T-191b 5100 test method.

The principles of the present invention will now be described in connection with the following illustrative examples.

EXAMPLE 1

A control vinyl film compound, designated Control A, was prepared, consisting of 40 phr CaCO$_3$, or 24.1% formula weight, and 44 phr diisononyl phthalate, or 22.1% formula weight. This control compound formulation represents a characteristic vinyl film that is commercially available in the art for use as wallcovering, and which is considered to be highly loaded with filler and having a low amount of plasticizer.

An embodiment of the present invention, designated Example A, was prepared using the same formulation as the control, except that the film compound contained an additional 80 phr BaSO$_4$ for a total 120 phr by mass, roughly 43.1% on formula weight. Because of the increase in the filler amount, the 44 phr diisononyl phthalate plasticizer present in both compounds represents a reduced formula mass of 6.3% as compared to 15.8%.

A control vinyl film compound, designated Control B, was prepared, consisting of 35 phr CaCO$_3$, or 15.8% formula weight, and 81 phr diisononyl phthalate, or 36.6% formula weight. This control compound formulation represents a characteristic vinyl film that is commercially available in the art for use as flexible residential upholstery material, and which is considered to be highly loaded with filler and having a high amount of plasticizer.

An embodiment of the present invention, designated Example B, was prepared using the same formulation as Control B, except that the film compound contained an additional 75 phr BaSO$_4$ for a total 110 phr by mass, roughly 36% on formula weight. Because of the increase in the filler amount, the 81 phr diisononyl phthalate, present in both compounds represents a reduced formula mass of 8.8% to 27.8%. The following observations are noted:
1. Although the resin to plasticizer ratio has remained unchanged, the ratio of resin to filler has been reduced. In the wall covering formulation, the ratio of filler to resin/plasticizer has gone from 21/79 to 46/54 and in the upholstery from 16/84 to 37/63. Surprisingly, there was no apparent loss in tensile performance or modulus, even though the relative amount of resin is reduced.
2. Shore hardness is essentially unchanged between the Control Compounds and the Inventive Compounds.
3. In the wallcovering formulation, when $BaSO_4$ is substituted 1:1 on mass with $CaCO_3$ the dynamic heat stability is reduced by 27%. When $BaSO_4$ is substituted 1:1 on volume with $CaCO_3$ the dynamic heat stability is increased by 18%. With the current level of $CaCO_3$, 40 phr, and an equal amount by mass of $BaSO_3$ is added to the system the dynamic heat stability is increased by over 43%. The latter is also with a 30% reduction in mixed metal and organophosphite thermal stabilizers. The internal lubricity of the system never changed, as calculated by the power drawn from the Banbury mixer used to prepare the compounds. The lubricity is quantified by minutes prior to degradation in the mixer.
4. In the wallcovering formulation, when $BaSO_4$ is substituted 1:1 on mass with $CaCO_3$ the static heat stability is increased by 5%. When $BaSO_4$ is substituted 1:1 on volume with $CaCO_3$ the static heat stability is increased by 5%. With the current level of $CaCO_3$, 40 phr and when an equal amount by mass of $BaSO_3$ is added to the system, the static heat stability is increased by over 13%. The latter is also with a 30% reduction in mixed metal and organophosphite thermal stabilizers. This is quantified by minutes prior to degradation.
Explanation of Results:
Modulus: The stress modulus was evaluated over a range of elongations, Control A and Example A from 5 to 150%, and Control B and Example B from 5 to 500%. At the lower elongations, a somewhat large variation is observed which is believed to be inconsequential for commercial applications. The low elongations are typically run for thin polymeric coatings. At the high elongations, little variation is observed except in Control B and Example B at 500% where there is a loss of 15%. All samples were run in triplicate.
Tensile at Max Load/Load at Max Load: Neither property was greatly affected at double the phr of filler 1:1 $CaCO_3$ and $BaSO_4$. However, at 3× the filler levels, reductions of 30% can be seen
Tear Strength: Tear strength was found to be relatively unaffected.
Cold Crack: A small effect was observed in this property. The wallcovering compound reduced cold crack from 30° F. to 25, and the upholstery compound increased from −25 to −10.
Color and Opacity: Evaluation of color and opacity was carried out on the wallcovering formulations, and a color shift to a darker color was observed with the integration of the $BaSO_4$. A synergistic effect for opacity was observed in the combination of the $BaSO_4$ filler with the TiO2 opacifier. Advantageously, the films of the present invention may provide enhanced effectiveness of pigments in providing desired color effect.
Heat Stability/Energy Consumption and Torque: Both static and dynamic heat stabilities were run on the wallcovering compounds, because of its lower internal lubricity and lower plasticizer level. Surprisingly, the combination of $BaSO_4$ and $CaCO_3$ were observed to improve thermal stability of the system. Power draw/torque were also run with acceptable results.

EXAMPLE 2

Experimental data was generated for control compounds as discussed in Example 1, and experimental formulations produced by added the indicated amount of $BaSO_4$ as shown in Table 1 below.

TABLE 1

|  | Control A | Control A ++44 phr $BaSO_4$ | % Δ | Control A ++88 phr $BaSO_4$ | % Δ | Control B | Control B +35 phr $BaSO_4$ | % Δ | Control B +70 phr $BaSO_4$ | % Δ |
|---|---|---|---|---|---|---|---|---|---|---|
| Stress Modulus (psi) |  |  |  |  |  |  |  |  |  |  |
| 5% | 284 | 421 | 48% | 292 | 3% | 8 | 0 | -100% | 3 | -63% |
| 10% | 534 | 694 | 30% | 531 | -1% | 50 | 42 | -16% | 36 | -39% |
| 50% | 1335 | 1463 | 10% | 1217 | -9% | 372 | 376 | 1% | 370 | -1% |
| 100% | 1783 | 1798 | 1% | 1487 | -17% | 711 | 709 | 0% | 699 | -2% |
| 300% |  |  |  |  |  | 1528 | 1489 | -3% | 1443 | -6% |
| 400% |  |  |  |  |  | 1875 | 1817 | -3% | 1841 | -2% |
| 500% |  |  |  |  |  | 2218 | 2126 | -4% | 1927 | -15% |
| 150% | 1875 | 1750 | -7% | 1800 | -4% | 833 | 808 | -3% | 808 | -3% |
| Tensile Max.Load (psi) | 2762 | 2564 | -7% | 1907 | -31% | 2441 | 2248 | -8% | 1984 | -23% |
| Load @ Max Load (lbs) | 9 | 8.1 | -10% | 6.3 | -30% | 6.1 | 6.2 | 2% | 4.8 | -27% |

TABLE 1-continued

| | | | | | | | |
|---|---|---|---|---|---|---|---|
| Mashland Cold Crack | 30° F. | 25° F. | | 30° F. | 25° F. | 10° F. | 10° F. |
| Tear Strength | 12X17 | 12X16 | | 12X15 | | | |
| Color | | | | | | | |
| L | 95.7 | 94 | | 93.4 | | | |
| a | 0.02 | 0.23 | | 0.58 | | | |
| b | 2.1 | 2.5 | | 3 | | | |
| Opacity | 63 | 57 | | 76 | | | |
| Opacity + TiO2 | 95.7 | 98.4 | | 99 | | | |
| Static Heat Stability Mathis Decomposition time (min) | 43 | 63 | 47% | | | | |
| Dynamic Heat Stability Brabender | | | | | | | |
| est. average torque | 540 mg | 425 mg | -21% | | | | |
| Decomposition time (min) | 100 | 120 | 20% | | | | |
| Dynamic Mill Stability 2 Hrs | Pass | Pass | | Pass | Pass | Pass | Pass |
| Banbury energy absorbtion | 19 | 20 | | 20 | 24.5 | 25.5 | 25.5 |

VOC Testing

The samples were placed in an emissions chamber at a loading ratio of 0.43 and sampled after 24 hrs in accordance with ASTM D5116-97. Compounds with responses $\geq 0.0031$ mg/m$^2$h of toluene are tentatively identified (compounds with <85% match are included to indicate compound type only) and were quantified as toluene. Individual VOCs are quantified using neat compounds. TVOC is defined as the compounds eluting between n-$C_6$ and n-$C_{16}$ quantified as toluene. All quantitation was done by GC/MS/FID using a modified EPA TO 17 method.

MAS Sample ID: M35212-1
Client Sample ID: Barium 1$^{st}$ Test

| | TVOC | mg/m$^2$h |
|---|---|---|
| | FID | 0.49 |
| | TIC | 1.12 |

Contact Angle Testing

Calendared vinyl compound samples—yellow contain a new additive while the white is a control.

These samples represent the first calendared product using Barium sulfate as an additional filler in a wall-covering product.

Five measurements for each data point were acquired using Dynamic Contact Angle Analyzer. The data is summarized in the table below.

| | Contact Angle, degree | |
|---|---|---|
| SID | Water | n-Hexadecane |
| White | 99.8 ± 1.2 | 36.6 ± 1.0 |
| Yellow | 90.4 ± 0.8 | 28.8 ± 0.8 |

Five measurements for each data point were acquired using Dynamic Contact Angle Analyzer. The data is summarized in the table below.

| | Contact Angle, degree | |
|---|---|---|
| SID | Water | n-Hexadecane |
| Aged BS | 101.6 ± 0.8 | 31.8 ± 0.4 |
| Aged Control | 106.7 ± 0.7 | 30.9 ± 1.1 |
| Jan. 19, 2005 Sample | 84.1 ± 1.4 | 21.2 ± 2.3 |

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed:

1. A vinyl halide polymer film comprising barium sulfate filler and calcium carbonate filler, wherein the film has a total filler content of at least about 60 phr and the ratio of barium sulfate filler to calcium carbonate filler is from about 1:3 to about 3:1 by weight.

2. The vinyl halide polymer film of claim 1, wherein the polymer is a polyvinyl chloride polymer.

3. The vinyl halide polymer film of claim 1, wherein the film has a total filler content of at least about 80 phr.

4. The vinyl halide polymer film of claim 1, wherein the film has a total filler content of at least about 100 phr.

5. The vinyl halide polymer film of claim 1, wherein the ratio of barium sulfate filler to calcium carbonate filler is from about 1:2 to about 2:1 by weight.

6. The vinyl halide polymer film of claim 1, wherein the film is from about 4 to about 15 mils thick.

7. The vinyl halide polymer film of claim 1, wherein the barium sulfate filler has an average particle size of from about 1 to about 10 microns.

8. The vinyl halide polymer film of claim 1, wherein the calcium carbonate filler has an average particle size of from about 1 to about 10 microns.

9. The vinyl halide polymer film of claim 1, wherein the film is sufficiently flexible to be bendable to an angle of 45 degrees at a force less than about 300 g*cm as measured by the Cantilever Bending Test (ASTM D5732).

10. The vinyl halide polymer film of claim 1, wherein the film is sufficiently flexible to be bendable to an angle of 45 degrees at a force less than about 240 g*cm as measured by the Cantilever Bending Test (ASTM D5732).

11. The vinyl halide polymer film of claim 1, wherein the film is sufficiently flexible to be bendable to an angle of 45 degrees at a force less than about 150 g*cm as measured by the Cantilever Bending Test (ASTM D5732).

* * * * *